July 2, 1963 E. E. DEMAND 3,095,709

HEAT TRANSFER APPARATUS

Filed Dec. 29, 1961

INVENTOR.
ERHART E. DEMAND
BY
[signature]
ATTORNEY

United States Patent Office 3,095,709

Patented July 2, 1963

3,095,709
HEAT TRANSFER APPARATUS

Erhart E. Demand, Philadelphia, Pa., assignor to Philco Corporation, Philadelphia, Pa., a corporation of Delaware Filed Dec. 29, 1961, Ser. No. 163,266
9 Claims. (Cl. 62—3)

The present invention relates to heat transfer apparatus and more particularly to thermoelectric devices of the kind in which heat is absorbed and rejected at junctions between bodies having dissimilar thermoelectric properties.

In a device of the kind mentioned above, it is customary to provide the heat-rejecting or hot junction side of the device with heat-dissipating fins which must be secured in good thermal contact with said side of the device. In order to insure better transfer of heat to the ambient air, it is desirable that the fins be so constructed and arranged as to extend outwardly for an appreciable distance from the heat-rejecting side of the device. In this manner there are provided passes or channels through which air may flow in intimate heat exchange relation with the fins to pick up and entrain heat therefrom.

The provision of a thermoelectric device with fins constructed and arranged as specified above, frequently results in structural as well as handling difficulties and problems. These difficulties and problems arise chiefly from the fact that the elongated fins are likely to be damaged or accidentally moved out of proper alignment during assembly and use of the device.

Accordingly it is a primary object of this invention to overcome the difficulties and problems which have heretofore been encountered in the construction and use of thermoelectric devices of the variety mentioned above. Toward attaining this general end, the invention provides a novel construction and association of elements cooperating to constitute a rugged unitary module which is capable of being readily manipulated without danger of injury or damage to such elements.

A more specific objective of the present invention has to do with the provision of an improved and novel thermoelectric module which is characterized by its structural simplicity and compactness.

The invention is further characterized by the fact that several thermoelectric modules embodying the principles of the invention, may readily be combined for cooperation in a single heat-absorbing and heat-rejecting apparatus. The modules are so associated that they may easily be removed as individual parts for repair or replacement without disturbing the module or modules remaining in such apparatus.

The nature of the invention, and its objects and advantages, will be more readily understood from the following description based on the accompanying drawing in which.

Figures 1, 2, 3, 4:
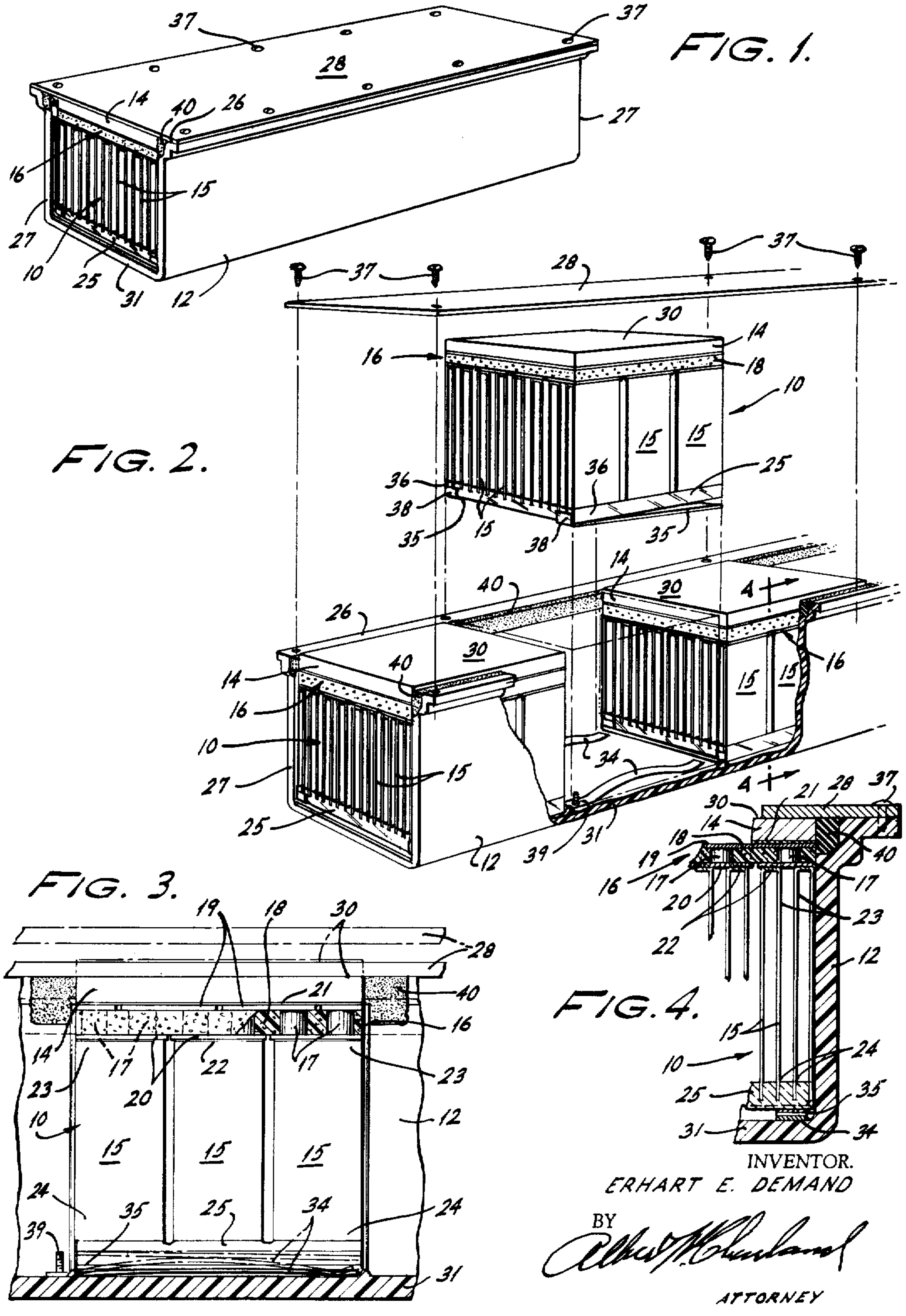
FIGURE 1 is a perspective view of one form of heat-absorbing and heat-rejecting apparatus which incorporates thermoelectric modules constructed in accordance with the invention.
FIGURE 2 is an exploded perspective view, partly in elevation and partly in section illustrating the association of modules of this invention in an apparatus as shown in FIGURE 1.
FIGURE 3 is an enlarged fragmentary elevational-sectional view of a portion of the apparatus illustrated in FIGURE 1.
FIGURE 4 is an enlarged fragmentary sectional view looking in the general direction of arrows 4—4 of FIGURE 2.

Having more particular reference to the drawing, there is illustrated a thermoelectric module 10 which, while capable of being used as an individual unit, is particularly advantageous when associated with other and similar modules for cooperative function to pick-up and reject heat in a cooling apparatus, and it is in connection with such apparatus that the invention will be described. In the illustrated embodiment, three modules, each incorporating within itself the primary principles of the invention, are associated together in a housing 12. Of course, it will be understood that the number of modules employed can be varied in accordance with the desired size, shape and cooling capacity of the apparatus.

Each module 10 is of generally cubic configuration and includes a heat-absorbing plate 14, an array of heat-rejecting fins 15, and an assembly 16 of thermocouples, the latter being arranged in intimate heat exchange relation with said plate and fins. As best seen in FIGURES 3 and 4 the assembly 16 comprises thermoelectric elements 17 isolated from each other by suitable insulation material 18, such as polystyrene plastic foam, within which said elements 17 are embedded. These elements are electrically interconnected in series by means of upper conductive straps 19 and lower conductive straps 20, said straps 19 and 20 being partially embedded in the insulation material 18. The thermoelectric elements 17 are in the form of blocks or bodies of P-type and N-type bismuth telluride or other suitable known material having dissimilar thermoelectric properties, so that by feeding electric current to said bodies in the required direction, there is produced a cooling effect at the upper connecting straps 19 and a warming effect at the lower connecting straps 20. The upper or cold junction straps 19 are secured to the underside of the heat-absorbing plate 14 by means of suitable insulating adhesive material 21, for example a thin layer of electrically insulating but thermally conductive epoxy resin, whereas the lower or hot junction straps 20 are secured to the fins 15 as by means of suitable solder 22 (see FIGURE 3). In this manner, heat absorbed by the plate 14 is transferred to the fins by function of the thermoelectric elements 17 and their connecting conductive straps 19 and 20.

As shown in the drawing, the fins 15 are constructed of a comparatively wide strip of material having high heat conductive properties, such as copper. These strips have the general shape of an inverted U, the closed end portion 23 of which is soldered to the hot junction straps 20 as mentioned above.

As seen in the drawing, the fins 15 constructed in the manner aforesaid provide elongated parallel channels for circulation of air in heat exchange relation directly with the fins to pick up and entrain the heat therefrom. In particular accordance with the invention, the fins 15 are positively stabilized and rigidly maintained in properly spaced position with respect to each other. For that purpose, the open end portions 24 of the inverted U-shaped fin strips are fixedly embedded in a base 25 of solid insulating material, for example hardened epoxy resin, which while electrically insulating the fins does not objectionably affect their heat conductive function.

As hereinbefore indicated the individual modules 10 are mounted in the housing 12 which, in the embodiment illustrated in the drawing, is in the form of a channeled member of nonconductive material and has an open top 26 and open sides 27. The modules are inserted in the housing through said open top and are adapted to seat within said housing so that the channels defined by the fins are aligned with the open sides 27 thereby allowing air to circulate in and out of the housing through said sides and channels and in intimate heat exchange with said fins.

A cover 28 for closing the open top of the casing, is so constructed and arranged that its underside bears directly upon upper exposed surface 30 of the heat-absorbing plate 14. For that purpose there is provided a resilient pressure means disposed between bottom wall 31 of the housing 12 and underside of the module bases 25 to support each module in position for contact by said cover 28. In the illustrated embodiment, the resilient pressure means consists of leaf springs 34 and rigid fingers 35, said leaf springs being bolted or otherwise secured to said bottom wall 31 of the housing and said rigid fingers being fixedly anchored to corner portions 36 of the modules base 25. The springs 34 and fingers 35 are such that the associated modules are urged upwardly and forced resiliently in contact with the underside of the cover 28 when the latter is lowered to cover the open top 26 of the housing and is secured by means of suitable fastening elements such as screws 37.

The cover 28 is constructed of metal having good heat conductivity, for example aluminum, so as to provide a good cooling surface, and the leaf springs 34 and rigid fingers 35 are constructed of electrically conductive material to serve as contact members providing for flow of electrical energy to the thermoelectric assembly of the modules 10. For that purpose the fingers 35 have portions 38 which are electrically connected to appropriate fins of the modules whereas the springs 34 are provided with terminals 39 for connection to a conventional source of electrical current required for the electrical input of the modules.

A sealing gasket 40 is so arranged between adjacent portions of the housing 12 and the seated modules 10 as to prevent air which flows through the housing in heat exchange relation with the heat dissipating fins 15, from leaking at adjacent portions of the closed top of said housing and of the thermoelectric assembly of said modules.

From the foregoing description, it will be recognized that a thermoelectric module constructed according to this invention possesses unusual rigidity and, because of the ruggedness of its assembly, eliminates danger of damage to its components without requiring the exercise of extreme handling care. It will also be recognized that convenient manual removability of individual modules from the housing is facilitated by lifting action of the contact spring and finger arrangement which upon removal of the closing cover as seen in FIGURES 2 and 3, raises the modules so that they protrude above the open top of the casing.

It will be appreciated that the invention, while shown in a preferred embodiment, is not limited to specific structures of that embodiment but embraces such changes and variations as come within the scope of the subjoined claims.

What I claim: is

1. A thermoelectric module comprising thermocouple means including a heat-rejecting side, an array of elongated heat-dissipating fins each having a first end portion arranged in heat exchange relation with said heat-rejecting side and a second end portion disposed remotely from said side, and electrically insulative material spaced from said side and arranged in stabilizing and insulating engagement with said second end portion of each fin, the portion of each fin between said first and second end portions being exposed in the space between said material and said heat-rejecting side.

2. A thermoelectric module as set forth in claim 1, in which the mentioned fins are constituted by generally U-shaped conductive strips, the closed end portions of said strips being conductively secured to the mentioned heat-rejecting side, and the open end portions of said U-shaped strips being embedded in the mentioned insulative material.

3. A thermoelectric module comprising thermocouple means including a heat-rejecting side, an array of elongated heat-dissipating fins each having oppositely disposed marginal portions, one marginal portion of each fin being arranged in heat exchange relation with said heat-rejecting side, the other marginal portion of each fin being disposed remotely from said side, and a rigid body of electrically insulative material spaced from said side, said other marginal portion of each fin being embedded in said body, and the portion of each fin between the two mentioned marginal portions thereof being exposed in the space between said body and said heat-rejecting side.

4. A thermoelectric module comprising a thermocouple assembly having thermoelectric elements and means providing hot junctions and cold junctions, a heat-absorbing plate arranged in heat exchange relation with said cold junctions, an array of elongated heat-dissipating fins having first end portions arranged in heat exchange relation with said hot junctions and second end portions disposed remotely from said hot junctions, and a rigid body of electrically insulative material spaced from said hot junctions and arranged in engagement with said second end portions of said fins, the portions of said fins between said first and second end portions being exposed in the space between said body and said hot junctions.

5. A thermoelectric module comprising a thermocouple assembly including thermoelectric elements and means providing hot junctions and cold junctions, a heat-absorbing plate arranged in heat exchange relation with said cold junctions, an array of U-shaped fins having their closed end portions arranged in heat exchange relation with said hot junctions, and a rigid body of electrically insulative material into which the open end portions of said fins are embedded.

6. A thermoelectric module comprising a thermocouple assembly including thermal elements and means providing hot junctions and cold junctions, a heat-absorbing plate arranged in heat exchange relation with said cold junctions, an array of elongated heat-dissipating fins consisting of strips of conductive metal constructed in the general shape of an inverted U, the closed end portions of said inverted U-shaped strips being arranged in heat exchange relation with said hot junction and a rigid body of electrically insulative material in which the open end portions of said inverted U-shaped strips are embedded.

7. In cooling apparatus, the combination of a housing having an open top and a bottom wall, thermoelectric means mounted in said housing, said means including thermoelectric elements having cold junctions and hot junctions, a heat-absorbing plate arranged in heat exchange relation with said cold junctions and confronting said open top of said housing, an array of elongated heat dissipating fins having portions arranged in heat exchange relation with said hot junctions, a rigid base of electrically insulative material arranged in engagement with the other end portions of said fins and overlying said bottom wall of said housing, a conductive cover for closing said open top, and resilient means interposed between said bottom wall and said base to urge and maintain said plate in direct contact with said cover.

8. In cooling apparatus, the combination set forth in claim 7, in which the mentioned resilient means includes interengageable leaf springs and rigid fingers, said leaf springs being affixed to the mentioned bottom wall of the housing, and said fingers being anchored to the mentioned base.

9. In cooling apparatus, the combination set forth in claim 7, in which the mentioned resilient means includes leaf springs and rigid fingers, said leaf springs being affixed to the mentioned bottom wall of the housing and said fingers being anchored to the mentioned base, said springs and fingers being constructed of conductive metal to provide for electrical connection to the mentioned thermoelectric means.

References Cited in the file of this patent

UNITED STATES PATENTS

| | | |
|---|---|---|
| 2,993,340 | Scheckler | July 25, 1961 |
| 3,008,300 | Ryan | Nov. 14, 1961 |